May 8, 1923.
W. E. O'BRIEN ET AL
1,454,764
BUMPER
Filed Feb. 14, 1922
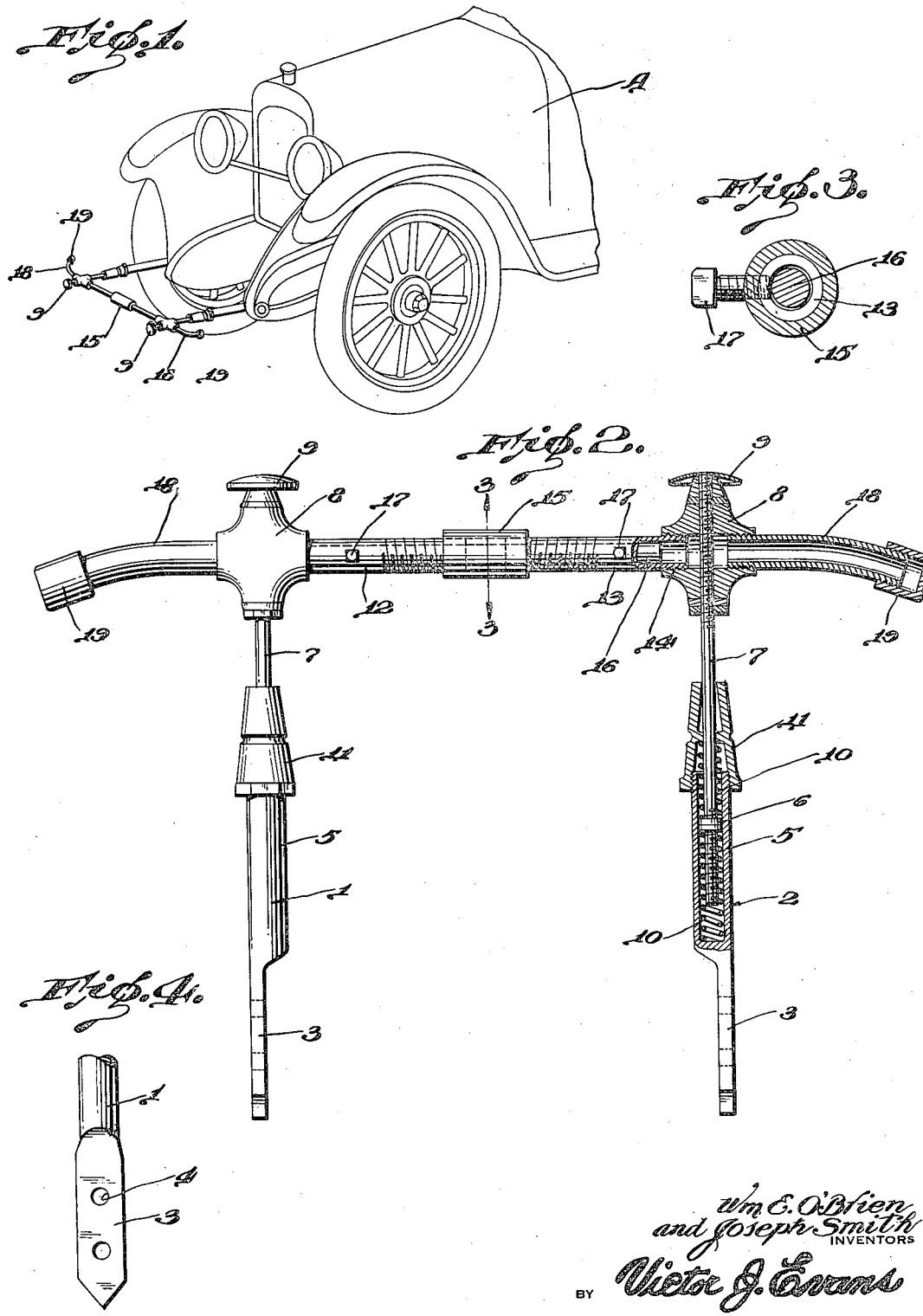

Patented May 8, 1923.

1,454,764

UNITED STATES PATENT OFFICE.

WILLIAM E. O'BRIEN AND JOSEPH SMITH, OF CHICAGO, ILLINOIS.

BUMPER.

Application filed February 14, 1922. Serial No. 536,442.

*To all whom it may concern:*

Be it known that we, WILLIAM E. O'BRIEN and JOSEPH SMITH, citizens of the United States, residing at Chicago, in the county of Cook and State of Illinois, have invented new and useful Improvements in Bumpers, of which the following is a specification.

This invention relates to bumpers for motor vehicles and an object of the invention is to provide a bumper structure which is designed so that a standard size of bumper may be made, and adjustable as to width and length, to accommodate it to any existing type of motor vehicle, eliminating the necessity of making particular sizes and types of bumpers for each individual type of motor vehicle.

Another object of this invention is to provide a bumper as specified, which is made up of a plurality of detachable parts so that in case any part becomes broken or distorted it may be replaced without requiring an entire new bumper.

A further object of this invention is to provide a bumper structure as specified which is neat in appearance and comparatively simple in construction, providing a yieldable bumper structure which will yield upon contact with an object, for relieving the shock of contact with an object.

Other objects of the invention will appear in the following detailed description taken in connection with the accompanying drawing wherein:

Fig. 1 is a perspective view of the improved bumper showing it applied to a fragment of a motor vehicle.

Fig. 2 is a top plan, partly in section of the improved bumper.

Fig. 3 is a section on the line 3—3, of Fig. 2.

Fig. 4 is a detail view of part of the attaching portion of the bumper.

Referring more particularly to the drawings, the improved bumper comprises attaching members 1 and 2 which are similar in construction, comprising flat portions 3 which are perforated as shown at 4 to receive bolts for attaching the bumper to a motor vehicle structure as shown at A. The attaching members 1 and 2 are provided with cylindrical portions 5 in which pistons 6 are mounted for reciprocatory movement. The pistons 6 are carried by rods 7 which project through the couplings 8 and have disc like heads 9 on their forward ends positioned for contact with an object struck by the bumper. Spiral springs 10 are positioned upon opposite sides of the pistons 6 and are confined within the cylindrical portions 5 by caps 11 which also form guides for the rods 7. The springs 10 form cushions for cushioning the striking force of the bumper structure and preventing the transmission of abrupt shocks to the vehicle upon which the bumper is mounted.

The couplings 8 have tubes 12 and 13 threadably connected thereto as shown at 14 and the facing ends of these tubes are oppositely screw threaded and connected by a sleeve nut 15. By adjustment of the nut 15 the couplings 8 may be moved towards or from each other for adjusting the width of the bumper to fit the particular type of vehicle upon which it is to be mounted. A stay or reinforcing rod 16 extends through the tubes 12 and 13 and is held against movement therein by means of cap screws 17.

Lateral projecting arms 18 are threadably connected to the couplings 8 and project outwardly from the couplings, having removable members 19 on their outer ends and being curved to present a neat appearance. In fact the entire bumper structure parts are designed and connected in such manner as to provide a neat appearing, durable bumper which may be attached to any existing types of motor vehicles and one in which any one of its number of parts may be replaced when necessary without requiring an entire new bumper.

The rods 7 thread into the couplings 8 as clearly shown in Fig. 2 of the drawings, so that the couplings and the cross structure composed of the tubes 12 and 13 and extensions 18 will move in unison.

It is, of course, to be understood that the invention may be constructed in other manners and the parts associated in other relations and, therefore, we do not desire to be limited in any manner except as set forth in the claims hereunto appended.

Having thus described our invention what we claim is:

1. In a vehicle bumper, attaching members, rods yieldably connected to said attaching members, bumping heads forming couplers adjustably mounted on said rods, tubes connected to said bumper heads and extending towards each other, and means adjustably connecting the facing ends of said tubes.

2. In a vehicle bumper, attaching members, rods yieldably connected to said attaching members, bumping heads forming couplers adjustably mounted on said rods, tubes connected to said bumper heads and extending towards each other, and means adjustably connecting the facing ends of said tubes, and a bracing rod in said tubes.

3. In a bumper for motor vehicles, attaching members, rods yieldably carried by said attaching members, couplings carried by said rods, tubes detachably carried by said couplings and extending transversely to said rods, and means adjustably connecting the facing ends of said tubes to permit adjustment of the distance between said rods.

4. In a bumper for motor vehicles, attaching members, rods yieldably carried by said attaching members, couplings carried by said rods, tubes detachably carried by said couplings and extending transversely to said rods, and means adjustably connecting the facing ends of said tubes to permit adjustment of the distance between said rods, and tubular extensions carried by said couplings and projecting outwardly therefrom transversely to the rods.

5. In a bumper for motor vehicles, attaching members, rods yieldably carried by said attaching members, couplings carried by said rods, tubes detachably carried by said couplings and extending transversely to said rods, and means adjustably connecting the facing ends of said tubes to permit adjustment of the distance between said rods, and a bracing rod extending longitudinally in said tubes.

6. In a bumper for motor vehicles, attaching members, rods yieldably carried by said attaching members, couplings carried by said rods, tubes detachably carried by said couplings and extending transversely to said rods, and means adjustably connecting the facing ends of said tubes to permit adjustment of the distance between said rods, and tubular extensions carried by said couplings and projecting outwardly therefrom transversely to the rods, and a bracing rod extending longitudinally in said tubes.

7. In a vehicle bumper, attaching members, rods extending into said attaching members, pistons on said rods, cushioning springs in said attaching members and engaging on both sides of said pistons, bumping head forming couplers carried by said rods, and adjustably connected members connecting said couplings.

8. In a vehicle bumper, attaching members, rods extending into said attaching members, pistons on said rods, cushioning springs in said attaching members and engaging on both sides of said pistons, and a bumping head structure carried by said rods.

In testimony whereof we affix our signatures.

WILLIAM E. O'BRIEN.
JOSEPH SMITH.